United States Patent [19]

Schmidt

[11] 4,379,961

[45] Apr. 12, 1983

[54] METHOD OF MAKING AN APPARATUS CONTAINING A DIAPHRAGM

[75] Inventor: Jorn M. Schmidt, Nordborg, Denmark

[73] Assignee: Danfoss A/S, Nordborg, Denmark

[21] Appl. No.: 197,517

[22] Filed: Oct. 16, 1980

Related U.S. Application Data

[63] Continuation of Ser. No. 48,845, Jun. 15, 1979, abandoned, which is a continuation of Ser. No. 898,092, Apr. 20, 1978, abandoned.

[30] Foreign Application Priority Data

Apr. 27, 1777 [DE] Fed. Rep. of Germany ....... 2718609

[51] Int. Cl.³ ............................................ B23K 11/16
[52] U.S. Cl. .................... 219/78.01; 219/92; 219/118; 219/78.16
[58] Field of Search ............... 219/78.01, 85 M, 78.16, 219/117.1, 92, 118; 220/85 B; 138/26, 30

[56] References Cited

U.S. PATENT DOCUMENTS

| | | |
|---|---|---|
| 2,005,256 | 6/1935 | Eitel et al. ................... 219/85 M |
| 2,614,198 | 10/1952 | Avery et al. ................... 219/78.16 |
| 3,140,382 | 7/1964 | Dijkmeijer et al. .............. 219/85 M |
| 3,695,297 | 10/1972 | Ferrentino ......................... 138/30 |

FOREIGN PATENT DOCUMENTS 751046  1/1967  Canada .................... 219/92

Primary Examiner—B. A. Reynolds
Assistant Examiner—Philip H. Leung
Attorney, Agent, or Firm—Wayne B. Easton

[57] ABSTRACT

The invention relates to a method for making a thin walled diaphragm unit of the type used in pressostats and thermostats. The method involves attaching a ring element to one end of a tubularly shaped diaphragm element which may have the bellows forming corrugations formed thereon either before or after the attachment of the ring element. Electrodes are utilized for physically pressing the parts together as well as providing for a flow of current through the joint to provide a metallurgical joining of the parts. A layer of an alloy of phosphorous and nickel is applied to the ring element which results in a heat joining of the parts which in effect is between soldering and welding.

1 Claim, 6 Drawing Figures

METHOD OF MAKING AN APPARATUS CONTAINING A DIAPHRAGM

This is a continuation application of Ser. No. 48,845, filed June 15, 1979, which in turn is a continuation application of Ser. No. 898,092, filed Apr. 20, 1978, both abandoned.

The invention relates to a method of making an apparatus containing a diaphragm, wherein a thin-walled diaphragm element, particularly a corrugated tube, is connected to a flange-forming ring, and to an apparatus for performing this method.

Diaphragm elements such as those used for thermostats, prossostats and many other purposes must be of very thin material, generally a thickness of only 0.1 mm, so that sufficient mobility is provided during operation. This applies to plate-shaped diaphragm elements as well as to diaphragm elements in the form of a corrugated tube or bellows. To simplify the connection of other parts, for example a housing, it is also already known to provide a corrugated tube with a ring forming a flange. For the purpose of sealingly connecting the corrugated tube to the flange or other parts, soldering has been employed. This soldering has the advantage that temperature stressing of the thin-walled material is kept low. However, a sacrifice was made in so far that remnants of flux remained at the soldered position. These flux remnants could be released during the life of the apparatus, particularly at an elevated operating temperature, whereupon they became mixed with the filling of the bellows and falsified the characteristics of the bellows system. Further, the operating temperature had to be kept below a certain limiting value, for example 80° to 90° C., because otherwise bubbles form before the solder is melted and give rise to leaks.

The invention is therefore based on the problem of providing a method of making an apparatus containing a diaphragm, particularly a corrugated tube, in which substantially higher operating temperatures are permissible and, if the apparatus contains a filling interfering influences on the characteristic of this filling are avoided.

This problem is solved according to the invention in that the diaphragm element is provided with an oblique rim extending at an angle to the axis of the diaphragm element, but the ring has a circular edge of a diameter between the internal and external diameters of the oblique rim, that between the oblique rim and the circular edge there is arranged a thin surface layer produced by chemical nickel plating, and that the oblique rim and longitudinal edge are pressed together by two axially relatively movable electrodes and are interconnected by the passage of a current.

Surprisingly, these features provide a sealed joint between the diaphragm element and the flange without vaporising the thin-walled material or making it brittle by excessively high temperatures. The temperature loadability of this joint is several hundreds of degrees Celsius. Falsification of the characteristic of a filling by reason of ejected flux is not possible.

If one regards the connecting process strictly as pressure welding, the thin-walled material would be destroyed. It should therefore appear that the use of a surface layer produced by chemical nickel plating results in a modification leading to something between soldering and welding. The surface layer which, in contrast with electrolytic nickel plating, does not consist of pure nickel but also contains a proportion of phosphorus, has a substantially higher electric resistance than the ring material and the diaphragm material. Consequently heating is concentrated in the surface layer. The melting temperature is at about 900° C. This temperature is therefore achieved when the ring and diaphragm materials have been heated to much lower temperatures. The tight joint seems to be produced in that the surface layer melts or even vaporises at the place of contact, it not being clear as yet as to whether this surface layer acts as a solder or a kind of catalyst. In any case, heating of the surface layer occurs so rapidly that the grains in the diaphragm and ring materials are not destroyed to a marked extent.

Advantageously, the surface layer is applied to the ring at least in the region of the circular edges. The material of the diaphragm element need then not be subjected to a chemical nickel bath which could detrimentally influence the properties of the material.

It has been found that a thickness of 4 to 8μ (microns) of surface layer is adequate. The expense of nickel plating is therefore low.

It is particularly favourable if use is made of a diaphragm element substantially of stainless steel. This material is known and proved. However, it becomes unusable if it is heated to above 700° C. Surprisingly, this temperature is not exceeded or exceeded by only a negligible extent even though higher temperatures occur in the surface layer.

Similar considerations apply to a diaphragm element substantially of a copper alloy such as brass or tin bronze.

A ferrous compound such as steel is recommended for the ring material. However, one may also use a copper alloy such as brass. Another choice is a chrome-nickel alloy.

In a preferred embodiment, the oblique rim is formed at the open end of a corrugated tube which is closed at one end. The finished apparatus will then contain a bellows. The corrugations which are primarily responsible for the mobility have a more or less large spacing from the oblique rim and are therefore no more than negligibly affected by the heating.

It is also advantageous to connect a cylindrical corrugated tube blank to the ring and only thereafter produce the corrugations. A cylindrical blank is stiff and therefore easy to handle. In addition, it can withstand considerable pressure.

This permits a further simplification in which the corrugated tube blank and the ring are pushed over each other, both are axially supported in a predetermined relative position, and the oblique rim is then produced by widening that part of the blank which projects beyond the circular edge. The oblique rim and the circular edge will then be disposed in the very position required for the joining step. In particular, the oblique rim can be produced by means of an electrode if this has a conical end face.

However, it is also possible for the corrugations to be produced prior to connection to the ring. In that case they should have a smaller diameter than the oblique rim so that the ring can be pushed on after this deformation.

Further, the ring can be connected at the inside to the oblique rim of a corrugated tube closed at one end and at the outside to an oblique rim of a cup-shaped housing surrounding the corrugated tube. In this way one obtains a closed bellows element in which the flange is connected to the corrugated tube on the inside in the same way as it is connected to the housing on the outside.

In many cases it is also advantageous if the ring is made in one piece with a cup-shaped housing surrounding the corrugated tube. The finished bellows then consist of only two parts which have been connected in the manner according to the invention. An apparatus for performing the method is characterised by a lower electrode with a higher central depression and a shallower annular depression adjoining same at the top and outside, and by an upper electrode with a conical end face. The central depression then serves to receive a corrugated tube or a cylindrical corrugated tube blank. The annular depression is intended to receive the ring. In this case the said components need merely be inserted in this depression, whereupon the upper electrode is pushed against the lower electrode. If desired, the oblique rim can be shaped simultaneously.

Desirably, the central depression is lined with an insulating layer. This tends to guide the corrugated tube or blank at the outside without producing contact with the lower electrode.

The invention will now be described in more detail with reference to an example illustrated in the drawing, wherein.

Figure 1:
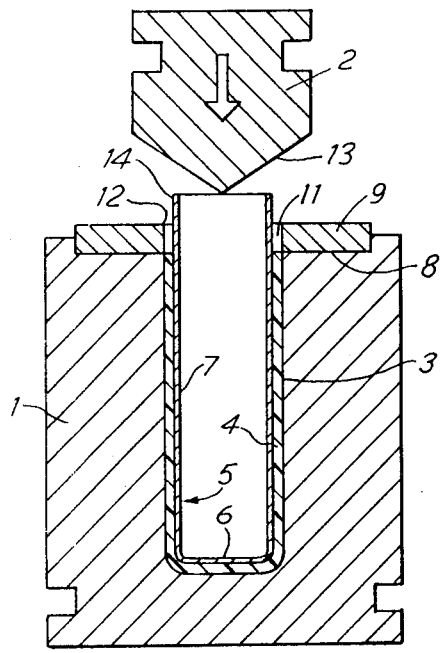
FIG. 1 shows two electrodes after insertion of the corrugated tube blank and the ring.
Figure 2:
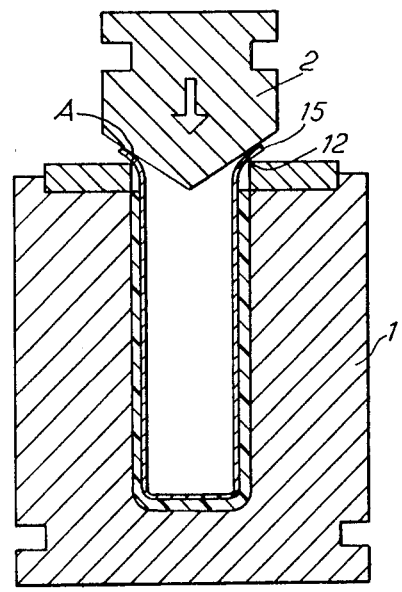
FIG. 2 shows the electrodes of FIG. 1 after producing the oblique rim.
Figure 3:
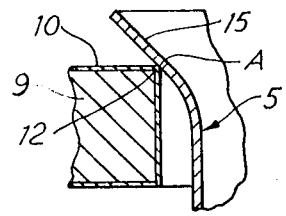
FIG. 3 is an enlarged representation of the contacting portions of the ring and oblique rim.

FIGS. 1 and 2 illustrate a lower electrode 1 and an upper electrode 2. The lower electrode 1 has a central depression 3 which is lined with an electric insulating layer 4. Inserted in this central depression there is a corrugated tube blank 5 having the shape of a cylinder 7 closed by a base 6. The blank 5 consists of a sheet of stainless steel of about 0.1 mm thickness. At the top and outside of the central depression 3, there is an adjoining annular depression 8 of shallower height containing a ring 9 of iron or ferrous material such as steel. This ring is provided with a 4 to 8μ surface layer 10 by chemical nickel plating. The ring orifice 11 is bounded at the top by a circular edge 12.

The upper electrode 2 has a conical end face 13 and is movable downwardly in the direction of the arrow. During this movement, the conical end face 13 engages in the end portion 14 of the blank 5 that projects beyond the ring 9. Since the base of the blank is supported at the bottom of the depression 3, the blank is widened and forms an oblique ring 15 which comes to lie against the edge 12 of the rim (FIG. 2). The oblique rim can, however, be preformed outside the electrodes.

If a current pulse is now passed through the material between the electrodes 1 and 2 by maintaining a predetermined residual pressure, there is very rapid heating at the line of contact A between the circular edge 12 and oblique rim 15 because the smallest contact section is obtained along the line of contact on the one hand and because the surface layer 10 has a high electric resistance in the other hand. The material of the surface layer melts and to some extent even vaporises whereby the desired joint is obtained between the oblique rim 15 and ring 9 as a result of the maintained pressure, without temperatures being produced to any marked extent in the corrugated tube blank 5 that might damage the material.

Subsequently, the cylinder 7 is shaped to form the actual corrugated tube. This can be done in any desired known manner, for example by grooving the tube on the outside, inserting counterbearing segments in the grooves and finally using an internal hydraulic pressure to expand the parts between the segments outwardly.

Figure 4:
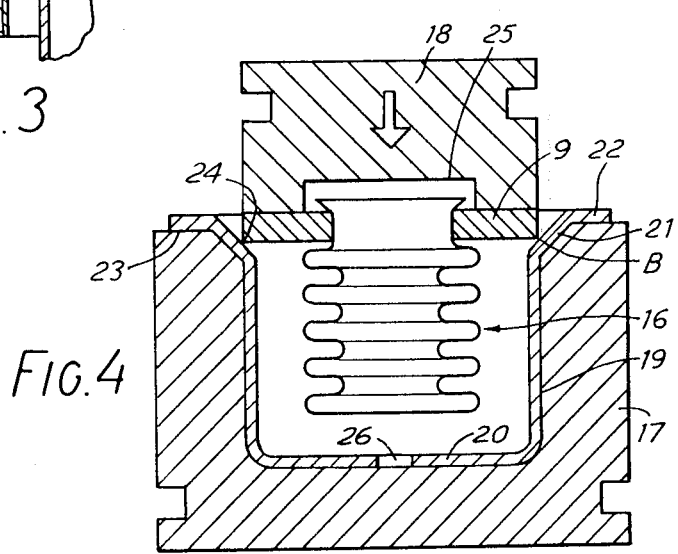
FIG. 4 shows two other electrodes for joining the ring to a housing.

In this way one obtains a corrugated tube 16 which is provided with a ring 9 in the manner shown in FIG. 4.

FIG. 4 also shows a second lower electrode 17 and a second upper electrode 18. The lower electrode has a central depression 19 in which a cup-shaped housing 20 of about 1.5 mm thick steel sheet is inserted. This housing likewise has an oblique rim 21 which is adjoined by a flange 22 with which the housing lies on the top 23 of the lower electrode 17. An outer circular edge 24 of the ring 9 co-operates with this oblique rim 21. The upper electrode 18 presses on the ring and has an aperture 25 for receiving the oblique rim 15 of the corrugated tube 16. A similar welded-soldered joint as along the line of contact A is then produced along the line of contact B. Although it is not absolutely necessary at this position, a surface layer produced by chemical nickel plating is harmless at this position.

This completes a bellows element which, with the aid of an aperture 26 in the housing 20, can be connected to a temperature sensor, a pressure sensor or the like. Production is extremely rapid because it is only necessary to insert the individual elements in the lower electrode, move the upper electrode downwardly and pass a current pulse through.

Figure 5:
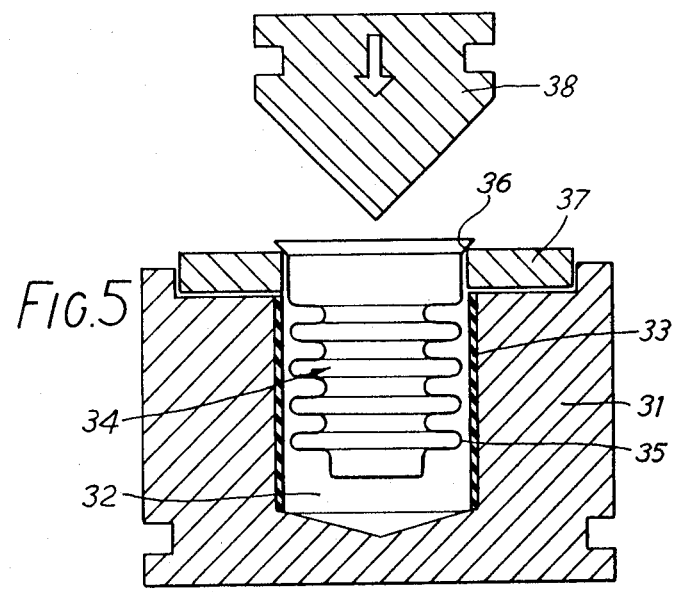
FIG. 5 shows two electrodes in a modified method.

FIG. 5 shows a lower electrode 31 having a central depression 32 which is lined with an insulating layer 33 and dimensioned so that it can receive a corrugated tube 34 which is closed at one end. Its corrugations 35 have an external diameter which is less than the external diameter of the oblique rim 36, preferably even only slightly larger than its internal diameter. In this way the prefabricated corrugated tube 34 can be introduced in the depression 32, the oblique rim 36 coming into contact with the edge of the ring 37. The upper electrode 38 may correspond to the upper electrode 2.

Figure 6:
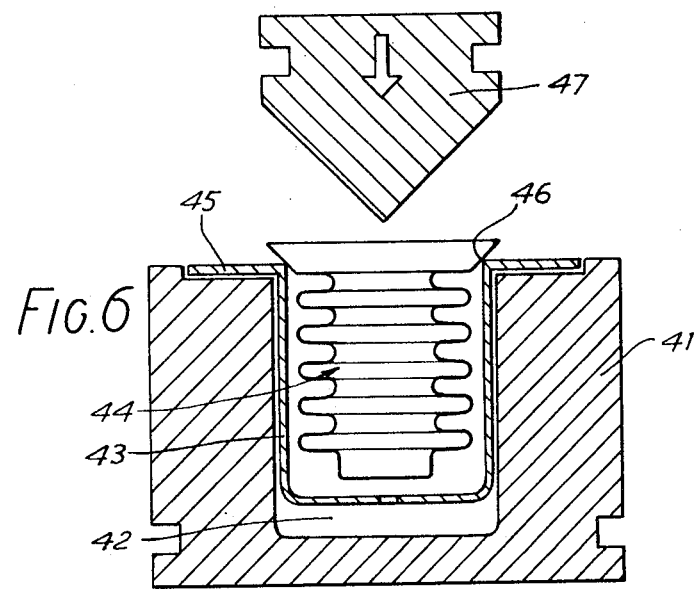
FIG. 6 shows two electrodes according to a further embodiment of the method.

In the embodiment of FIG. 6, the lower electrode 41 is provided with a central depression 42 which is so large that it can receive a cup-shaped housing 43 which surrounds the prefabricated corrugated tube 44. The ring 45 to which the oblique rim 46 of the corrugated tube is to be secured is made in one piece with the housing 43. Here, too, the upper electrode 47 may correspond to the upper electrode 2. In this case the housing 43 must be chemically nickel-plated at least in the region of the ring 45.

In all the embodiments, the corrugated tube may also consist of a copper alloy such as brass or tin bronze. The ring may also consist of a copper alloy such as brass or a chrome-nickel alloy. Instead of the corrugated tube one can also use a flat diaphragm. The lower electrode can then be correspondingly differently shaped.

I claim:

1. A method of making apparatus having a thin walled diaphragm unit, comprising the steps of, initially forming a thin tube element of a ferrous compound and with a cylindrical shape, providing a ring element of a ferrous compound having an inside diameter larger than the diameter of said tube element, forming an oblique rim on said tube element, applying a layer of from 4 to 8 microns of an alloy of phosphorous and nickel having a melting point of about 900° C. only on the ring element, said alloy having a substantially higher electrical resistance than said ferrous compounds, placing said ring element in surrounding relation to said tube element in juxtaposition to said rim, said layer being between said ring element and said rim, and pressing said rim into contact with said ring element while passing an electric current through said rim and said ring element to provide heat for joining said elements together, said heat being concentrated in said layer of said alloy which attains a substantially higher temperature than said tube and ring elements by reason of said substantially higher electrical resistance thereof.

* * * * *